(12) United States Patent
Runesson

(10) Patent No.: US 7,818,988 B2
(45) Date of Patent: Oct. 26, 2010

(54) STRIKER PLATE AND SHEET-METAL FORMING TOOL COMPRISING SUCH A STRIKER PLATE

(75) Inventor: Johann Runesson, Linkoping (SE)

(73) Assignee: Stromsholmen AB, Tranas (SE)

( * ) Notice: Subject to any disclaimer, the term of this patent is extended or adjusted under 35 U.S.C. 154(b) by 834 days.

(21) Appl. No.: 11/664,328

(22) PCT Filed: Sep. 28, 2005

(86) PCT No.: PCT/SE2005/001428

§ 371 (c)(1),
(2), (4) Date: May 14, 2007

(87) PCT Pub. No.: WO2006/038855

PCT Pub. Date: Apr. 13, 2006

(65) Prior Publication Data

US 2008/0016929 A1 Jan. 24, 2008

(30) Foreign Application Priority Data

Oct. 1, 2004 (SE) .................................... 0402404

(51) Int. Cl.
*B21D 22/21* (2006.01)
(52) U.S. Cl. ..................... 72/351; 72/453.1; 72/466.9

(58) Field of Classification Search ............. 72/350, 72/351, 441–446, 453.01–453.19, 466.19; 100/265

See application file for complete search history.

(56) References Cited

U.S. PATENT DOCUMENTS

| 4,111,024 | A | | 9/1978 | Dahlman et al. |
| 4,831,861 | A | * | 5/1989 | Hofmann et al. ........... 72/355.6 |
| 6,749,185 | B1 | * | 6/2004 | Reilly et al. ................. 267/119 |
| 6,796,159 | B2 | * | 9/2004 | Kelm et al. .................... 72/351 |
| 7,124,614 | B2 | * | 10/2006 | Cronholm et al. ............. 72/350 |
| 2004/0187546 | A1 | | 9/2004 | Kodani |

FOREIGN PATENT DOCUMENTS

| DE | 3623188 | 9/1987 |
| EP | 1034858 | 3/2000 |
| EP | 1394939 | 3/2004 |

* cited by examiner

*Primary Examiner*—Dana Ross
*Assistant Examiner*—Matthew G Katcoff
(74) *Attorney, Agent, or Firm*—Fay Sharpe LLP; Brian E. Turung

(57) ABSTRACT

A striker plate for a sheet-metal forming tool designed to be arranged between a gas-filled spring having a striking surface on a piston rod stop and a surface situated on the sheet-metal forming tool and thereby to receive force from the gas-filled spring in sheet metal forming. The striker plate includes a spring part arranged between a striker part and a bottom part, and is designed to be arranged at one of the surfaces.

38 Claims, 5 Drawing Sheets

STRIKER PLATE AND SHEET-METAL FORMING TOOL COMPRISING SUCH A STRIKER PLATE

The present invention claims priority on International Patent Application Serial No. PCT/SE2005/001428 filed Sep. 28, 2005, published as WO 2006/038855 on Apr. 13, 2006, which in turn claims priority on Swedish Patent Application Serial No. 0402404-8 filed on Oct. 1, 2004, published as SE 526302 on Aug. 16, 2005, all of which are incorporated herein by reference.

TECHNICAL FIELD

The present patent application relates to a striker plate for a sheet-metal forming tool, and more particularly to a striker plate for a sheet-metal forming tool that is designed to be arranged between a gas-filled spring that has a striking surface on a piston rod stop and a surface situated on the sheet-metal forming tool and which striker plate is designed to receive force from the gas-filled spring during the sheet metal forming process.

BACKGROUND OF THE INVENTION

Gas-filled springs have a high initial force relative to their maximum force, the initial force being the force that is needed in order for the piston rod of the gas-filled spring to start moving and for springing to commence. In a sheet-metal forming tool a number of gas-filled springs are usually arranged in parallel, so that in sheet metal forming they are acted upon simultaneously by the movements from a press. The stresses in the press and the sheet-metal forming tool will therefore increase rapidly when the gas-filled springs arranged in parallel are simultaneously encountered by the movement of the press. Rapid changes in the forces also occur when the gas-filled springs are simultaneously relieved. These rapid variations in the force place heavy stresses on tools, gas-filled springs and mechanical parts of the press, and also give rise to vibrations.

When the gas-filled spring is placed under a load by the sheet-metal forming tool striking against the piston rod, mechanical noise and rumbling occur. This noise may be experienced as an irritation and may have an adverse effect on the working environment. This applies particularly in industries with many presses and sheet-metal forming tools in the same premises. The noise level varies, depending among other things on which type of press tools and what size of gas-filled springs are used.

The design of sheet-metal forming tools is largely influenced by the intended shape of the sheet metal after forming and the larger the sheet-metal forming tool the more expensive it is. This means that the space in a sheet-metal forming tool is limited by design and cost considerations.

Sheet-metal forming tools and associated parts have high reliability requirements and the speeds for upward and downward movement of the press, for example, may be 0.3 to 1.6 m/s with frequencies of 0.3 to 1.2 strokes per second, an initial force on each gas-filled spring of 7,500 to 180,000 N during a working shift and a total of approximately 1 million strokes, that is to say forming operations between major services.

SUMMARY OF THE INVENTION

An object of the invention is to at least reduce one or some of the aforementioned problems. This object is achieved by using a striker plate for a sheet-metal forming tool that is designed to be arranged between a gas-filled spring having a striking surface on a piston rod stop and a surface situated on the sheet-metal forming tool, and which striker plate is designed to receive force from the gas-filled spring during the sheet metal forming process. The striker plate includes a spring part that is arranged between a striker part and a bottom part, and is designed to be arranged at one of the surfaces.

In furnishing the striker plate according to the invention, the invention provides for a striker part, a spring part, and a bottom part, which are arranged so that an impact on a gas-filled spring directly from a press or indirectly via a sheet-metal forming tool is sprung by means of the spring part, with the result that the rapid increase in force for the press and the gas-filled spring occasioned thereby will occur over a longer period of time, which among other things not only reduces the stresses in the press and the gas-filled spring but also the vibrations and shock loading. This reduces the risk of tool damage and wear to the press, and reduces the noise level.

The striker plate according to the invention furthermore provides a stop, which limits the spring travel to a predetermined length. The striker plate also has at least one guide, which counteracts displacements of the piston rod striking surface transversely to the direction of movement of the piston rod.

The striker plate according to the invention can include a springing guide that is designed to guide the striker part in the axial direction of the piston rod. The striker plate according to the invention can have the spring part providing a maximum force which is greater than the initial force of the gas-tilled spring. The striker plate according to the invention can include a stop that is designed to limit the spring travel under loading from the gas-tilled spring. The striker plate according to the invention wherein the bottom part having a cylindrical recess, which together with the striker part forms a space for the spring part, and a holder which holds the striker part to the bottom part. The striker plate according to the invention can include a holder that has a locking ring arranged at the edge of the recess in the bottom part and is designed to hold the striker part to the spring part. The striker plate according to the invention can include a guide that includes a guide part connected to the striker plate and a guide part connected to the bottom part, and wherein the two guide parts having complementary shapes and are designed, under the impact resilience of the spring part, to be mutually supportive in their displacement relative to one another in the axial direction of the piston rod. The striker plate according to the invention can include two guide devices, wherein the first device is arranged centrally in the striker part and the second device is arranged at the periphery of the striker part.

BRIEF DESCRIPTION OF THE DRAWINGS

The invention will be described in more detail below with reference to the drawings attached, in which.

DETAILED DESCRIPTION OF INVENTION

Further constituent parts and characteristics of the present invention will be set forth in the following detailed description considered in conjunction with the drawings attached. It should be appreciated, however, that the drawings are drafted solely for illustrative purposes and not as a definition of the scope of the invention, for which reference should be made to the patent claims attached. It must be further understood that the drawings are not necessarily produced to scale and that, unless otherwise stated, they are merely intended to illustrate the concept of the structures and processes here described.

Figure 1:
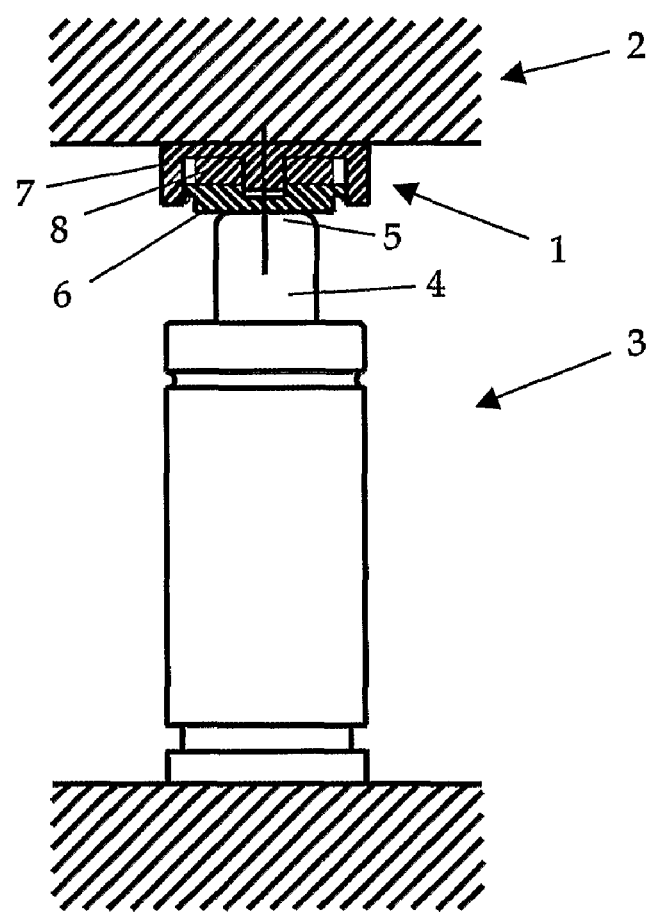
FIG. 1 illustrates a partially sectional view of a gas-filled spring and a striker plate arranged between two parts of a sheet-metal forming tool.

FIG. 1 illustrates a striker plate 1 arranged between the piston rod 4 of a gas-filled spring and a part of a sheet-metal forming tool. The striker plate 1 according the embodiment in FIG. 1 comprises a striker part 6 and a bottom part 7 together with a spring part 8 arranged between them.

Figure 2:
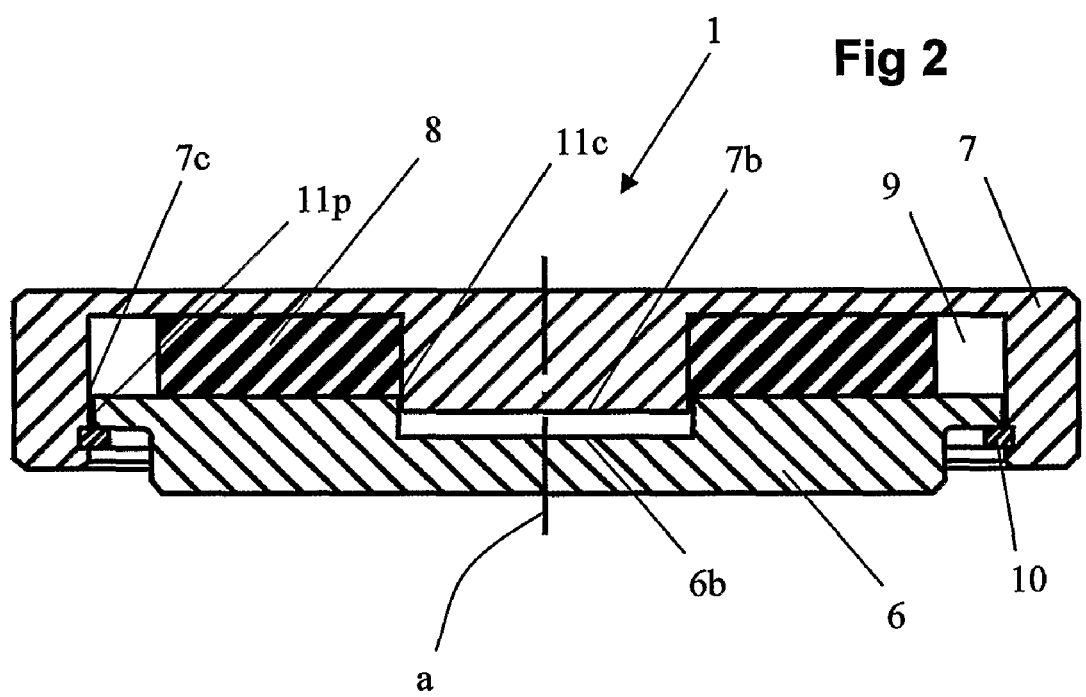
FIG. 2 illustrates a cross-sectional view of a striker plate in a non-loaded state.

The bottom part 7 has a cylindrical recess, which forms a space 9 for the spring part 8 and the striker part 6. In the preferred embodiment according to FIG. 2, the spring part 8 comprises an annular disc of a polymer material, such as polyurethane. At the edge of the recess is a groove in which a holder 10 is arranged. The holder 10 is exemplified by a locking ring in FIGS. 2 to 9. The locking ring 10 here holds the striker part 6 together against the spring part 8. The spring part 8 may be tensioned to different degrees depending on the application. In the preferred embodiment, however, it is tensioned either very lightly or not at all. In the middle of the recess in the bottom part, a stop 7b rises up from the bottom of the recess. The striker part 6 in turn has a recess 6b with a complementary shape to the stop 7b, so that when the striker plate 1 is under a load and the striker part 6 moves, the stop 7b will slide in the recess 6b in the striker part. This means that the stop 7b and the recess 6b in the striker part form a guide 11c, so that the striker part 6 under a load basically moves axially in the cylindrical recess in the bottom part, that is to say along an axis a in the direction of movement of the piston rod 4. This guide 11c is centrally located in the striker plate 1 and thus basically in direct extension of the piston rod 4. The striker part 6 is also guided in that its periphery rests against the walls 7c of the cylindrical recess. A further guide 11p is thereby formed. These guides 11c and 11p serve to counteract oblique and lateral loading and hence displacements of the striker part 6 in a radial direction, that is to say transversely to the spring travel of the spring part 8. This in turn counteracts angular displacement and oblique loading of the piston rod 4 of the gas-filled spring, which has a positive effect on the life of the gas-filled spring 3. The effect of the guides 11 also serves to prolong the life of the polymer disc.

Figure 3:
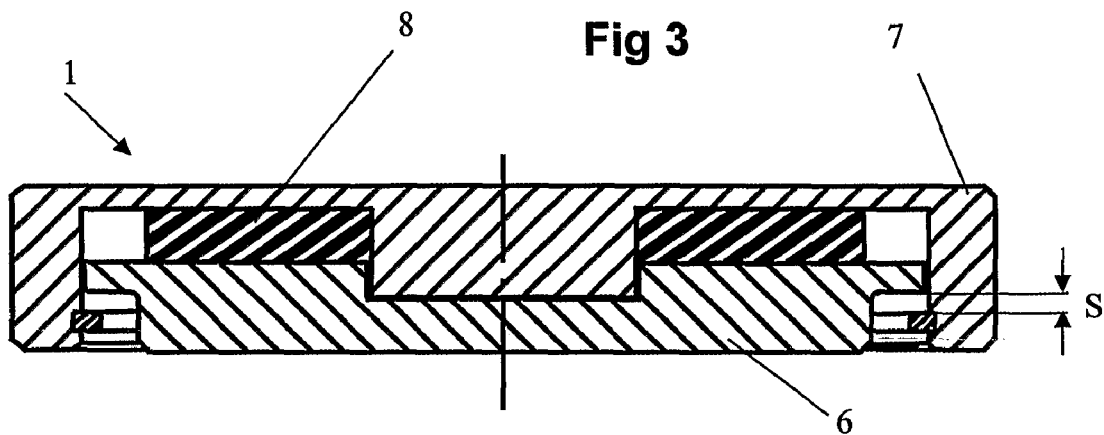
FIG. 3 illustrates a cross-sectional view of a striker plate in a loaded state.
Figure 4:
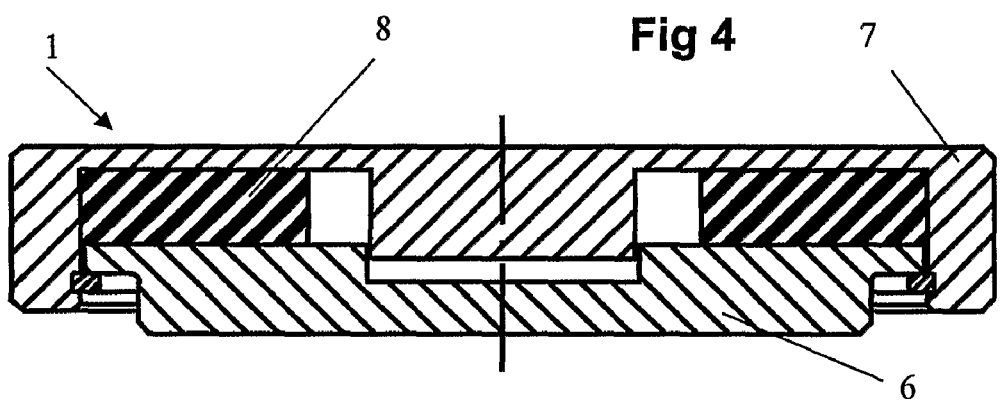
FIG. 4 illustrates a cross-sectional view of a striker plate with an alternative placing of the spring part.

The height of the stop 7b and the recess 6b in the striker part are matched together so as to give a predefined maximum spring travel s, see FIG. 3. The stop 7b gives this spring travel even if heat or wear, for example, should cause the spring characteristic of the spring part 8 to vary. When maximum spring travel s is attained, the stop 7b is in contact with the innermost part of the recess 6b in the striker part and the striker part 6 has thereby bottomed, as is shown in FIG. 3. The stop 7b relieves the spring part 8 under high loads and thereby prolongs the life of the spring part 8. Under the spring action therefore, the striker part can move along axis a between the locking ring 10 and the stop 7b. The length of this movement depends on the requisite spring travel, the spring characteristic of the spring part 8 and the initial force of the gas-filled spring 3. Since the space in a sheet-metal forming tool 2 is limited, a spring travel s of less than 40 mm is often desirable. A preferred spring travel s is approximately 0.5 to 7 mm, and a more preferred spring travel s is approximately 2 to 4 mm.

The spring force of the striker plate 1 ranges from zero or almost zero, depending on any tensioning, up to maximum spring force at the maximum spring travel. The maximum spring force depends on the particular application, 0.5 to 1.5 times the initial force of the gas-filled spring being an approximate guide, the preferred value being approximately 0.8 to 1.4 times. In applications where the height of the striker plate 1 cannot be too great, for example, the spring part can be tensioned so that the spring characteristic describes a force of approximately 0.2-0.5 to 0.6-1.2 times the initial force of the gas-filled spring 3.

The space 9 for the spring part 8 is larger than the actual spring part 8, so that under a load it can expand/move in a radial direction in the space 9. The polymer disc 8 bears against the stop 7b and expands radially outwards under a load, see FIG. 3. In an alternative embodiment, the polymer disc is arranged against the wall of the space, see FIG. 4 and expands radially inwards towards the stop 7b. In yet another alternative embodiment, the polymer disc is situated in the middle of the space and is therefore able to expand radially both outwards and inwards at the same time. Under a load, the polymer disc 8 therefore performs a sliding movement towards the inner surfaces of the space 9 and these slide surfaces therefore have a predefined surface fineness so as to limit the friction.

Figure 5:
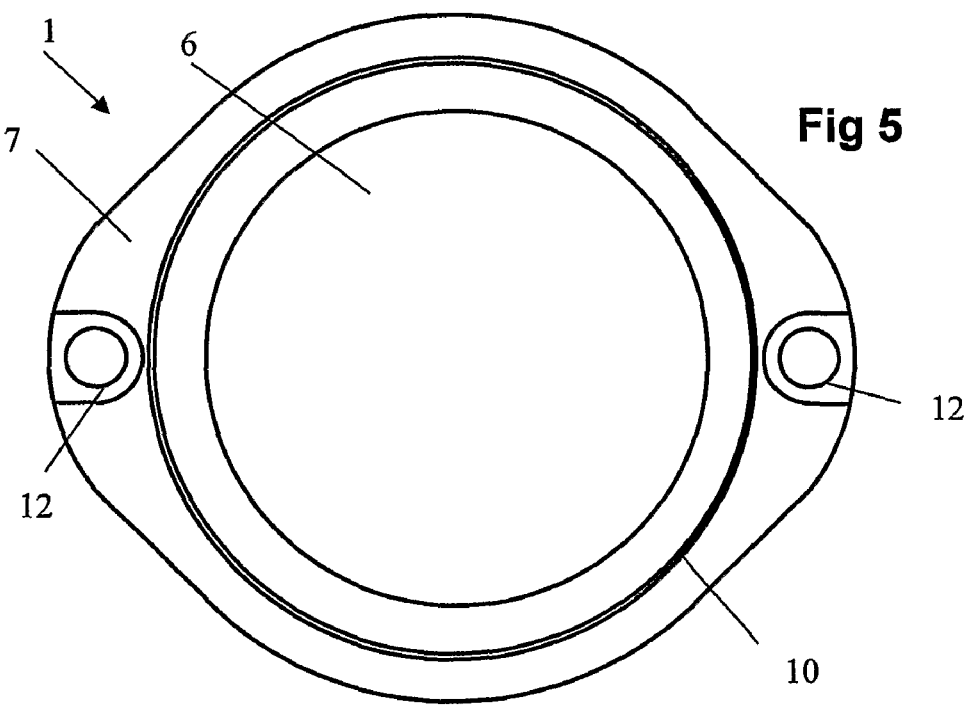
FIG. 5 illustrates a view from above of one embodiment of a striker plate according to the invention.
Figure 6:
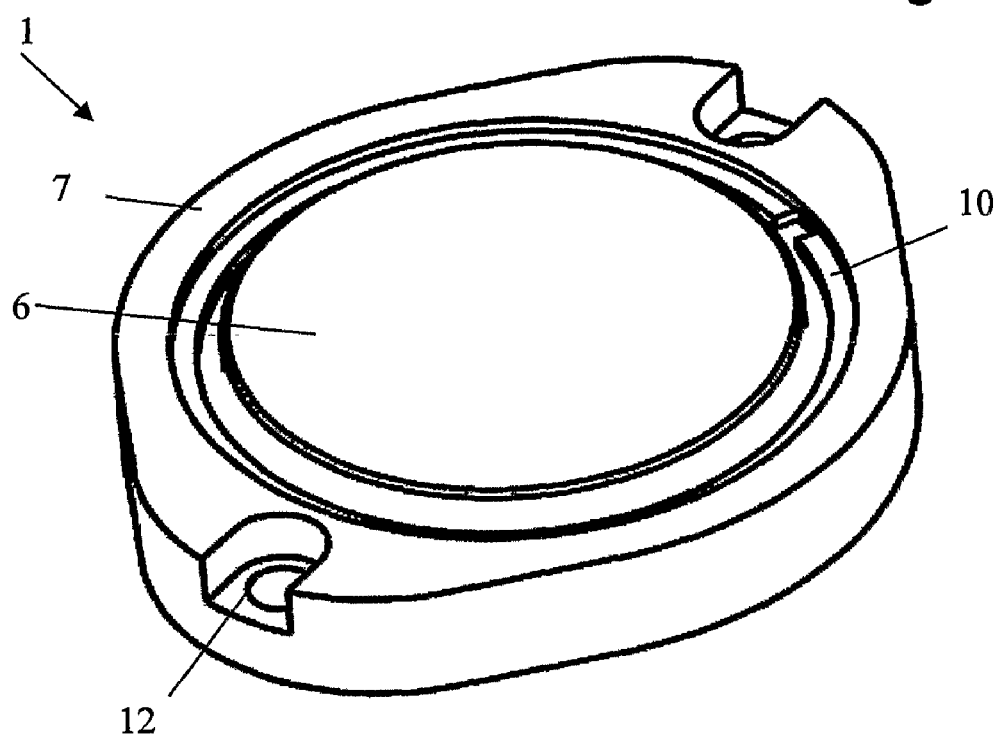
FIG. 6 illustrates a perspective view of one embodiment according to the invention of a striker plate.
Figure 7:
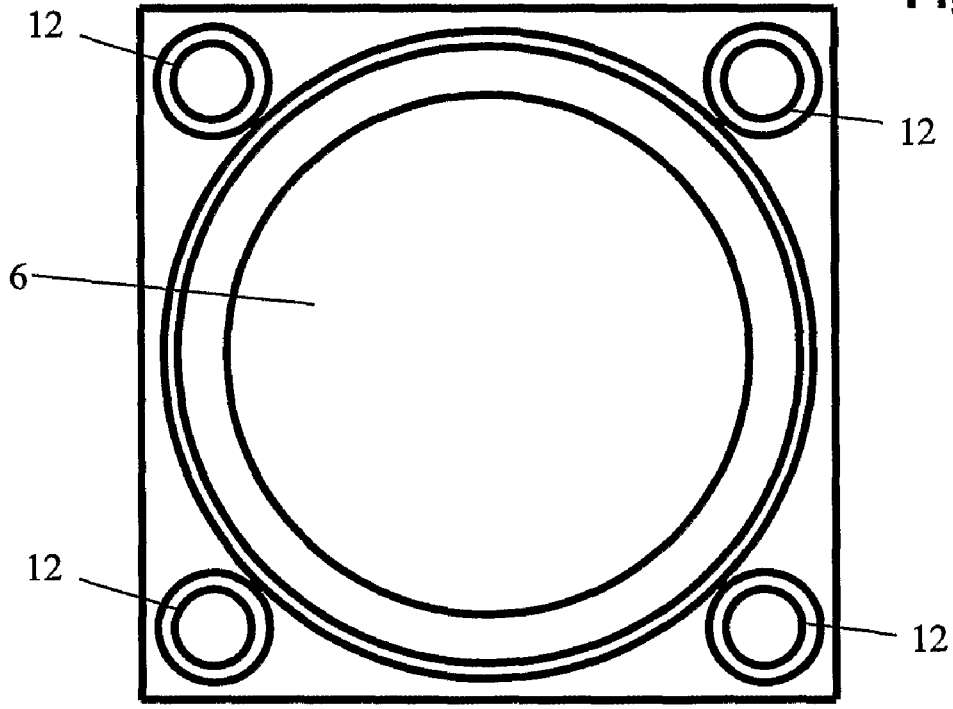
FIG. 7 illustrates a view from above of one embodiment of a square striker plate according to the invention having holes for fixing devices at the corners.

FIGS. 5 and 6 illustrate a striker plate 1 intended to be fitted to a sheet-metal forming tool 2 by means of two bolts, and FIG. 7 illustrates a striker plate intended to be fitted to a sheet-metal forming tool 2 by means of four bolts (not shown) through four bolt holes 12.

The striker plate 1 may alternatively be fitted to a part of the sheet-metal forming tool 2 or to the piston rod stop 5. The striker plate 1 may furthermore be fitted so that it continuously bears with a certain load, for example a sheet metal clamp may rest with its weight on the striker plate 1, that is to say so that striker part 6 is in constant contact with the piston rod stop 5. In other arrangements, the striker plate 1 is fitted so that the piston rod stop 5 and the striker part 6 are encountered with a certain velocity, usually the speed of the press, so that a recoil occurs. In the preferred embodiment the space 9 is furthermore basically enclosed, in that the striker part 6 adjoins the cylindrical recess in the bottom part, see FIGS. 2 to 9, for example. This therefore prevents dirt and contamination getting in and thereby prevents any detrimental changes in the spring characteristics.

Figure 10:
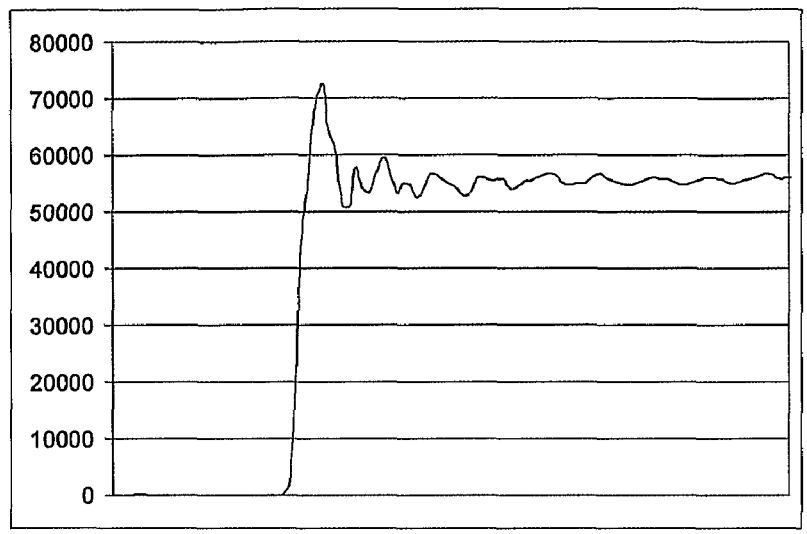
FIG. 10 illustrates a diagram of the impact force between a part of a press tool and a piston rod without striker plate.

FIG. 10 illustrates a diagram of how the impact force increases from zero to a maximum impact force before then tailing off towards the initial force of the gas-filled spring 3. No striker plate 1 was used for recording this diagram. FIG.

Figure 11:
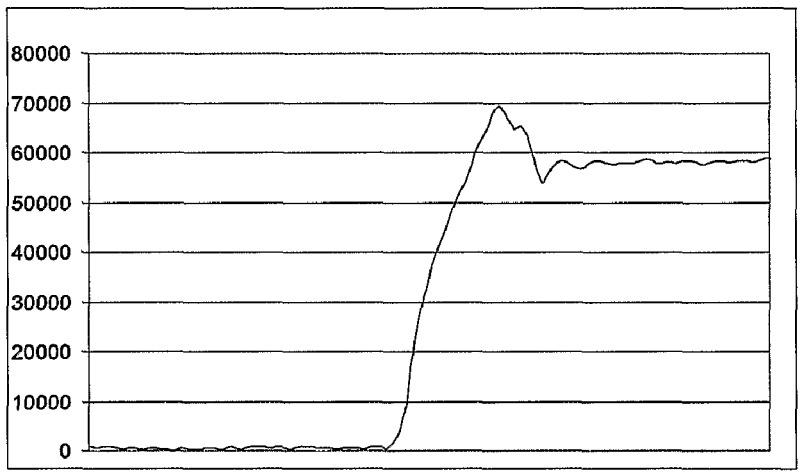
FIG. 11 illustrates a diagram of the impact force between a part of a press tool and a piston rod when a striker plate is arranged between the piston rod and the press tool part.
Figure 12:
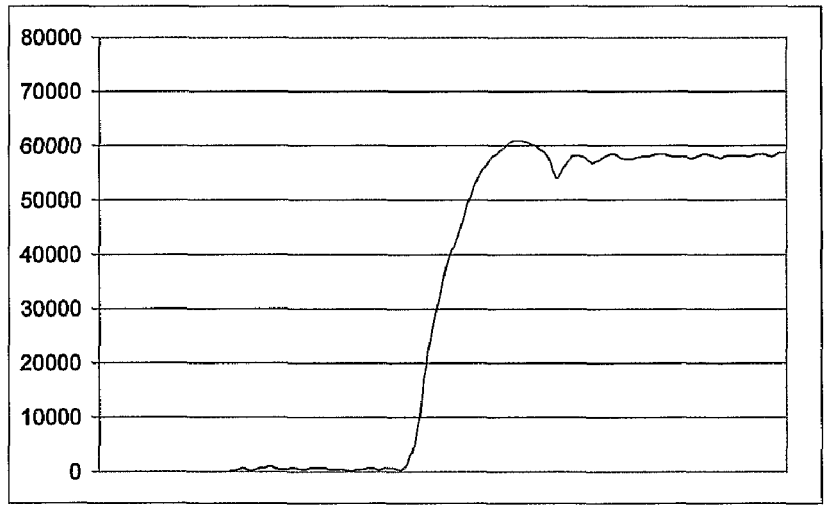
FIG. 12 illustrates a diagram with a more ideal curve over the impact force between a part of a press tool and a piston rod.

11 illustrates a diagram in which the striker plate 1 according to the invention was used between the piston rod 4 of the gas-filled spring and the part of the sheet-metal forming tool 2. In this case, the curve has a shallower gradient, that is to say it takes a longer time to reach maximum force. It will also be seen that the maximum force is lower than when no striker plate 1 was used. It also shows how the striker plate 1 reduces the vibrations; see the part of the curve immediately after the impact in FIG. 11 compared to FIG. 10. In FIGS. 10, 11 and 12, the vertical axis shows the force, graduated between 0 and 80,000 Newton, and the horizontal axis shows the time, the time for the entire axis shown being equal to approximately 0.02 seconds.

Figure 8:
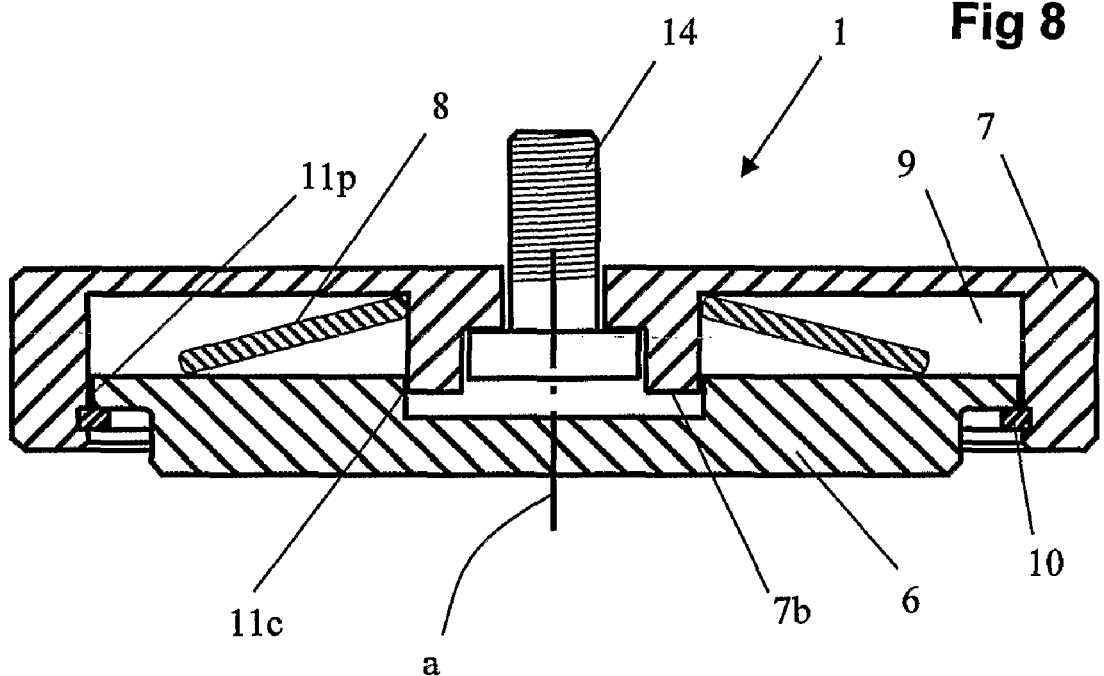
FIG. 8 illustrates a cross-sectional view of one embodiment according to the invention of a striker plate having a disc spring and a centrally located fixing device.
Figure 9:
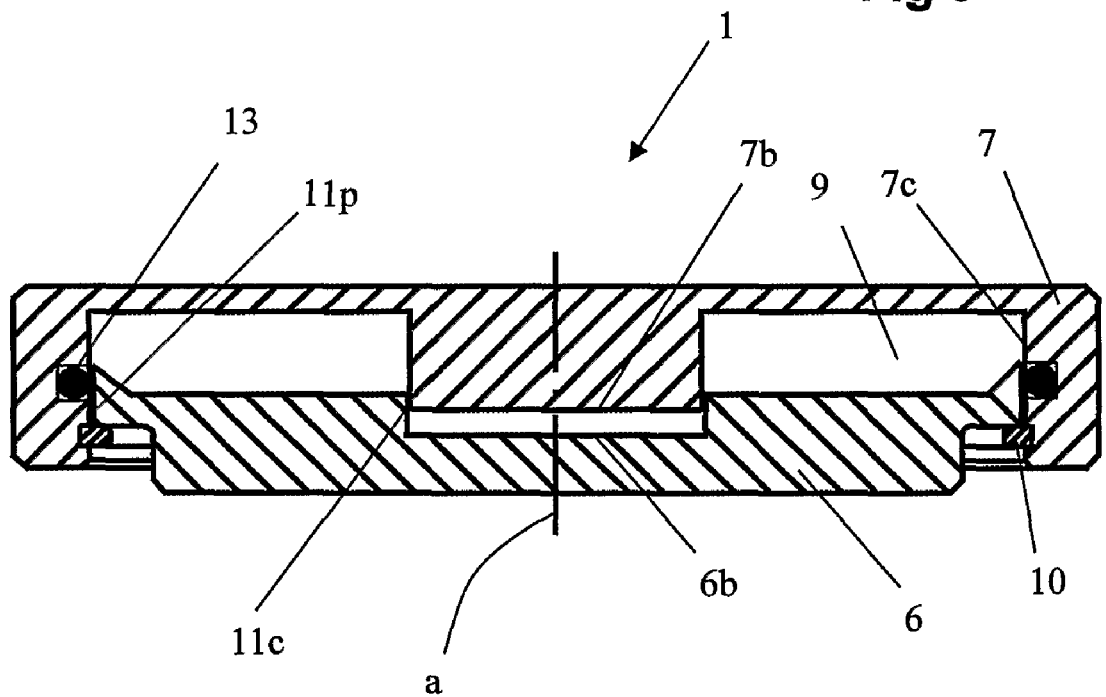
FIG. 9 illustrates a cross-sectional view of one embodiment according to the invention of a striker plate having a pneumatic spring.

In a further alternative embodiment, the spring part 8 comprises a disc spring, which can be arranged in the same way as the polymer disc against the stop 7 or against the wall, see FIG. 8. In yet another alternative embodiment the space 9 is sealed by means of a seal 13 and is filled with a gas, such as air, for example, see FIG. 9, the gas constituting a spring element. In FIG. 8 an alternative fastening device is exemplified by a centrally located bolt 14 placed through the bottom plate.

In yet another alternative embodiment the maximum spring travel may be limited by an annular heel (not shown), which runs along the wall of the cylindrical recess. The heel is arranged so that the periphery of the striker part 6 comes to rest against the heel when maximum spring travel has been reached.

The invention is not limited to the embodiments described above but may be modified without departing from the scope of the following patent claims. For example, the bottom part may be incorporated into the tool part in that the shapes of the bottom part are machined out of the tool part, or the bottom part can be incorporated into the piston rod stop. Thus, whilst fundamental, new characteristics of the invention have here been shown, described and pointed out as they apply to a preferred embodiment thereof, it will be appreciated that those skilled in the art will be capable of making various omissions, substitutions and modifications to the design and components of the arrangements illustrated, and to their application, without departing from the idea of the invention. For example, it is expressly intended that all combinations of the elements performing basically the same function in basically the same way in order to achieve the same result come with the scope of the invention. Examples of this might include devices for holding the spring part and the striker part in their positions, such as snap attachments or other screw fastenings, that differ from those shown in the figures, or those instances in which the gas-filled spring is arranged in a sheet-metal forming tool in a press and the piston rod stop applies loading to a part of the press during sheet metal forming, so that this part of the press must also be regarded as a sheet-metal forming tool. It will be further appreciated that structures and/or elements that have been demonstrated and/or described in connection with any design or embodiment of the invention shown can be incorporated into any other design or embodiment shown or described or indicated, as a general design alternative. It is therefore intended that the only restrictions be those indicated by the scope of the patent claims hereto attached.

I claim:

1. A striker plate for use with a sheet-metal forming tool that is designed to be axially arranged between a gas-filled spring and a surface situated on the sheet-metal forming tool, said striker plate including a striker part and a bottom part and a spring element arranged in a space between the striker part and the bottom part, said striker part and said bottom part at least partially aligned along a central axis of said striker plate, said gas-filled spring having a striking surface on a piston rod stop, said striker part designed to receive force from said gas-filled spring during a sheet metal forming process when the striking surface axially move downwardly on said striker part, said bottom part including a recess designed to telescopically receive at least a portion of said striker part and to at least partially contain said spring element, said spring element located between an upper surface of a base of said recess and a bottom surface of said striker part.

2. The striker plate as defined in claim 1, including a guide arrangement designed to guide said striker part as said striker part moves at least partially in said recess of said bottom part in an axial direction of said striker plate during contact by the piston rod, a first guide arrangement is formed between an outer peripheral edge of said striker part and in inner side wall surface of said recess, a second guide arrangement is at least partially located along said axis of said striker plate.

3. The striker plate as defined in claim 2, wherein said second guide arrangement comprising a cavity in said bottom surface of said striker part and guide element extending upwardly from said upper surface of said base of said recess of said bottom part, said cavity in said striker part extending only partially through an axial length of said striker part, said guide element designed to be at least partially telescopically received in said cavity in said bottom surface of said striker part when said striker part moves in said axial direction during contact by the piston rod.

4. The striker plate as defined in claim 1, wherein said spring element includes a compressible polymer material, mechanical spring, or gas sealed between said striker part and said bottom part.

5. The striker plate as defined in claim 2, wherein said spring element includes a compressible polymer material, mechanical spring, or gas sealed between said striker part and said bottom part.

6. The striker plate as defined in claim 3, wherein said spring element includes a compressible polymer material, mechanical spring, or gas sealed between said striker part and said bottom part.

7. The striker plate as defined in claim 1, wherein said bottom part includes a stopper arrangement designed to limited the amount of axial movement of said striker part during contact of said striker part by the piston rod, said stopper arrangement preventing said bottom surface of said striker part from contacting said upper surface of said base of said recess of said bottom part.

8. The striker plate as defined in claim 2, wherein said bottom part includes a stopper arrangement designed to limit the amount of axial movement of said striker part during contact of said striker part by the piston rod, said stopper arrangement preventing said bottom surface of said striker part from contacting said upper surface of said base of said recess of said bottom part.

9. The striker plate as defined in claim 3, wherein said second guide arrangement designed to limit the amount of axial movement of said striker part during contact of said striker part by the piston rod, said second guide arrangement preventing said bottom surface of said striker part from contacting said upper surface of said base of said recess of said bottom part.

10. The striker plate as defined in claim 6, wherein said second guide arrangement designed to limit the amount of axial movement of said striker part during contact of said striker part by the piston rod, said second guide arrangement preventing said bottom surface of said striker part from contacting said upper surface of said base of said recess of said bottom part.

11. The striker plate as defined in claim 1, wherein recess in said bottom part is generally cylindrical.

12. The striker plate as defined in claim 10, wherein recess in said bottom part is generally cylindrical.

13. The striker plate as defined in claim 1, including a holder component designed to prevent said striker part separating from said bottom part, said holder component maintaining said spring element under tension prior to the gas-filled spring applying an axial force on to said striker part.

14. The striker plate as defined in claim 10, including a holder component designed to prevent said striker part separating from said bottom part, said holder component maintaining said spring element under tension prior to the gas-filled spring applying an axial force on to said striker part.

15. The striker plate as defined in claim 13, wherein said holder component includes a locking ring.

16. The striker plate as defined in claim 1, including a gas sealing ring designed to form a gas seal about said spring element.

17. A striker plate for use with a sheet-metal forming tool that is designed to be axially arranged between a gas-filled spring and a surface situated on the sheet-metal forming tool, said striker plate including a striker part, a bottom part, a spring element, a holder component, and a spring guide, said spring element arranged in a space between the striker part and the bottom part, said spring guide designed to guide said striker part as said striker part moves in an axial direction of said striker plate during contact by the piston rod, said gas-filled spring having a striking surface on a piston rod stop, said striker part designed to receive force from said gas-filled spring during a sheet metal forming process when the striking surface axially move downwardly on said striker part, said bottom part including a recess designed to telescopically receive at least a portion of said striker part and to at least partially contain said spring element, said spring element located between an upper surface of a base of said recess and a bottom surface of said striker part, said striker part and said bottom part at least partially aligned along a central axis of said striker plate, said spring guide including a first guide comprising a cavity in a bottom surface of said striker part and guide element extending upwardly from said upper surface of said base of said recess of said bottom part, said cavity in said striker part extending only partially through an axial length of said striker part, said guide element designed to be at least partially telescopically received in said cavity in said bottom surface of said striker part when said striker part moves in said axial direction during contact by the piston rod, said bottom part includes a stopper arrangement designed to limit the amount of axial movement of said striker part during contact of said striker part by the piston rod, said stopper arrangement preventing said bottom surface of said striker part from contacting said upper surface of said base of said recess of said bottom part, said holder component designed to prevent said striker part separating from said bottom part.

18. The striker plate as defined in claim 17, wherein said cavity in said striker part is centrally located in said striker part of said cavity.

19. The striker plate as defined in claim 17, wherein said spring guide includes a second guide arrangement that is formed between an outer peripheral edge of said striker part and in inner side wall surface of said recess.

20. The striker plate as defined in claim 17, wherein said spring element includes a compressible polymer material, mechanical spring, or gas sealed between said striker part and said bottom part.

21. The striker plate as defined in claim 17, wherein said holder component includes a locking ring.

22. The striker plate as defined in claim 17, including a gas sealing ring designed to form a gas seal about said spring element.

23. The striker plate as defined in claim 18, wherein said spring guide includes a second guide arrangement that is formed between an outer peripheral edge of said striker part and in inner side wall surface of said recess.

24. The striker plate as defined in claim 18, wherein said spring element includes a compressible polymer material, mechanical spring, or gas sealed between said striker part and said bottom part.

25. The striker plate as defined in claim 23, wherein said spring element includes a compressible polymer material, mechanical spring, or gas sealed between said striker part and said bottom part.

26. The striker plate as defined in claim 17, wherein said holder component maintaining said spring element under tension prior to the gas-filled spring applying an axial force on to said striker part.

27. The striker plate as defined in claim 18, wherein said holder component maintaining said spring element under tension prior to the gas-filled spring applying an axial force on to said striker part.

28. The striker plate as defined in claim 17, wherein said spring element includes a compressible polymer material, at least a portion of said compressible polymer material spaced from an inner wall surface of said recess of said bottom part so as to enable said compressible polymer material to expand into a region of said recess that did not include said compressible polymer material when said compressible polymer material expands due to axial downward movement of said striker part into said recess.

29. The striker plate as defined in claim 25, wherein said spring element includes said compressible polymer material, at least a portion of said compressible polymer material spaced from an inner wall surface of said recess of said bottom part so as to enable said compressible polymer material to expand into a region of said recess that did not include said compressible polymer material when said compressible polymer material expands due to axial downward movement of said striker part into said recess.

30. The striker plate as defined in claim 17, wherein said spring element includes said compressible polymer material, at least a portion of said compressible polymer material spaced from said guide element extending upwardly from said upper surface of said base of said recess of said bottom part so as to enable said compressible polymer material to expand into a region of said recess that did not include said compressible polymer material when said compressible polymer material expands due to axial downward movement of said striker part into said recess.

31. The striker plate as defined in claim 25, wherein said spring element includes said compressible polymer material, at least a portion of said compressible polymer material spaced from said guide element extending upwardly from said upper surface of said base of said recess of said bottom part so as to enable said compressible polymer material to expand into a region of said recess that did not include said compressible polymer material when said compressible polymer material expands due to axial downward movement of said striker part into said recess.

32. The striker plate as defined in claim 31, wherein at least a portion of said compressible polymer material is always in contact with an inner wall surface of said recess of said bottom part.

33. The striker plate as defined in claim 10, including a gas sealing ring designed to form a gas seal about said spring element.

34. The striker plate as defined in claim 1, wherein said spring element includes a compressible polymer material, at least a portion of said compressible polymer material spaced from an inner wall surface of said recess of said bottom part so as to enable said compressible polymer material to expand into a region of said recess that did not include said compressible polymer material when said compressible polymer material expands due to axial downward movement of said striker part into said recess.

35. The striker plate as defined in claim 10, wherein said spring element includes said compressible polymer material, at least a portion of said compressible polymer material spaced from an inner wall surface of said recess of said bottom part so as to enable said compressible polymer material to expand into a region of said recess that did not include said compressible polymer material when said compressible polymer material expands due to axial downward movement of said striker part into said recess.

36. The striker plate as defined in claim 3, wherein said spring element includes said compressible polymer material, at least a portion of said compressible polymer material spaced from said guide element extending upwardly from said upper surface of said base of said recess of said bottom part so as to enable said compressible polymer material to expand into a region of said recess that did not include said compressible polymer material when said compressible polymer material expands due to axial downward movement of said striker part into said recess.

37. The striker plate as defined in claim 10, wherein said spring element includes said compressible polymer material, at least a portion of said compressible polymer material spaced from said guide element extending upwardly from said upper surface of said base of said recess of said bottom part so as to enable said compressible polymer material to expand into a region of said recess that did not include said compressible polymer material when said compressible polymer material expands due to axial downward movement of said striker part into said recess.

38. The striker plate as defined in claim 37, wherein at least a portion of said compressible polymer material is always in contact with an inner all surface of said recess of said bottom part.

* * * * *